Patented May 7, 1935

2,000,033

UNITED STATES PATENT OFFICE 2,000,033

PROCESS FOR THE MANUFACTURE OF THIOINDIGO DYES

Herbert August Lubs and John Elton Cole, Wilmington, Del., assignors to E. I. du Pont de Nemours & Company, Wilmington, Del., a corporation of Delaware No Drawing. Application September 22, 1932, Serial No. 634,421

24 Claims. (Cl. 260—53)

This invention relates to a new and improved process for the manufacture of thioindigo dyes, particularly from ortho-amino-aryl-thioglycollic acids.

According to the literature on the subject (D. R. P. 184,496–190, 291–190,674 Liebigs Annalen vol. 351, p. 390) thioindigo dyes have been commonly manufactured from the corresponding ortho-amino-aryl-thioglycollic acids by means of a series of reactions indicated in the following simplified equations:

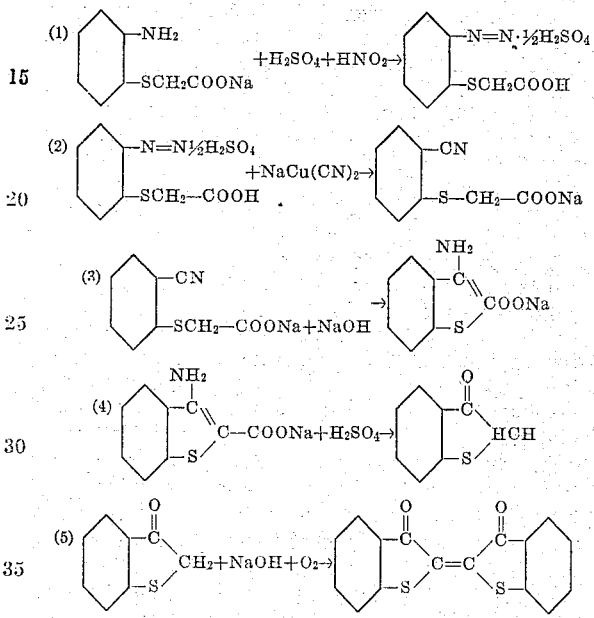

According to the disclosures in the literature, the reaction represented by Equation (1) above is generally carried out in a strong acid solution. The diazo solution thus obtained is then treated with $NaCu(CN)_2$, in accordance with Equation (2), under such conditions that the product of Equation (2) remains in solution as its sodium salt. This solution is then treated with acid to precipitate the ortho-cyano-aryl-thioglycollic acid together with cuprous cyanide. The precipitate is filtered and then agitated with alkali sufficient in amount to dissolve the nitrile and yet leave the cuprous cyanide almost quantitatively behind. The resulting clarified nitrile solution is then subjected to treatment with caustic alkali as indicated in Equation (3). The solution resulting from the reaction indicated by Equation (3) is then saturated with salt and cooled, the sodium salt of the carboxy-3-amido-thioindoxyl separating out and being removed by filtration. This precipitate is treated with sulfuric acid as in Equation (4) and then finally with caustic and oxidizing agents as in Equation (5).

This old and commonly used process is expensive to operate and results in the production of a somewhat impure product. Also the yield of dye is not as high as is desired. All of these features have contributed to render the market price of this type of dye relatively high, thereby greatly reducing the commercial use of such dyestuffs.

A large part of the difficulties attending the carrying out of such a process resides in the isolation and purification of the ortho-cyano-aryl-thioglycollic acid produced by the reaction indicated by Equation (2). This ortho-cyano-aryl-thioglycollic acid is somewhat soluble in acid solution and accordingly part of the product is lost in the filtrate. Also, the ortho-cyano-aryl-thioglycollic acid—cuprous cyanide mixture, precipitated by means of acid, forms a somewhat slimy mass which is exceedingly difficult to filter and wash, thereby rendering the filtration step an expensive operation. Further, when it is attempted to remove the nitrile from the cuprous cyanide with the alkali solution, appreciable portions of the nitrile remain with the cuprous cyanide, due to the condition of the cuprous cyanide, which renders it practically impossible to completely remove all of the nitrile therefrom. Also, small amounts of the cuprous cyanide go into solution, contaminating the product.

An object of the present invention is to provide a new and improved process for the production of thioindigo dyes from ortho-amino-aryl-thioglycollic acids. A further object is to provide such a process whereby many of the objectionable features of the prior processes are eliminated. Still further objects are to provide a process for preparing thioindigo dyes whereby higher yields of purer dye are produced in less time and at less expense. Other objects will appear hereinafter.

These objects may be accomplished in accordance with our invention which comprises treating an ortho-amino-aryl-thioglycollic acid to form the diazo compound in the usual way, then treating the diazo solution with $NaCu(CN)_2$ in the usual manner, then treating the resulting solution of the nitrile and cuprous cyanide with an alkali sulfide, either with or without caustic alkali, to convert the nitrile to the alkali salt of the carboxy-3-amido-thioindoxyl which is then isolated and treated in the usual way.

We have discovered that by bringing about the reaction indicated by Equation (3) in the crude solution from the Sandmeyer reaction, indicated by Equation (2), in the presence of caustic alkali and sodium sulfide, much labor and time is saved with increase in the yields and purity of the dye. As will appear to those familiar with the art, this could not be foreseen because the volumes of solution involved in the reaction indicated by Equation (2) are necessarily large and it seems unreasonable, at first glance, that the product of the reaction indicated by Equation (3), (which is known to be water soluble) could be as quantitatively removed from the alkali solution as the corresponding ortho-cyano-aryl-thioglycollic acid (product of Equation (2)) could be removed from the acid solution as was done in the prior practice.

In order to more clearly illustrate our invention and the preferred mode in which we contemplate carrying the same into effect, the following examples are given:

*Example 1.*—24 parts of 1-sodium-thioglycollate-2-amino-3-methyl-5-chlorbenzene were dissolved in cold water. To this solution 8½ parts of sodium nitrite were added with agitation. This solution was dropped slowly into 200 parts of water containing 21 parts of sulfuric acid. During this operation the temperature was maintained below 10° C. The clear yellow solution was neutralized with soda ash solution and then dropped, with good agitation, into a solution of sodium cuprous cyanide. The sodium cuprous cyanide was made by heating together 32.5 parts of $CuSO_4 5H_2O$ and 22 parts of sodium cyanide in 20% aqueous solution. During this last addition, the temperature was maintained at 75–80° C. When the resulting reaction mass no longer showed the presence of the diazo compound, it was rendered strongly alkaline by adding 60 parts of sodium hydroxide and 18.5 parts of $Na_2S.9H_2O$ thereto. The temperature was held at 90° C. for 1 hour after which 200 parts of salt were added and the mixture cooled to about 15° C. The product was removed by filtration. Its most probable formula is represented by the product of Equation (3). This crude product was dissolved in 700 parts of hot water rendered slightly alkaline to phenolphthalein by the addition of ½ part of NaOH. The solution was filtered and the filtrate added to 100 parts of water containing 22 parts of sulfuric acid, keeping the temperature at 80° C. for 2 hours. The mixture was made alkaline with sodium hydroxide. The dyestuff was obtained by oxidation from this suspension by known methods. The yield was 13.5 parts of pure dye. An exactly similar experiment using old methods in which the 1-thioglycollic-2-cyano-3-methyl-5-chlorbenzene was isolated by acid and purified by alkali gave a yield of only 12.5 parts of 6,6'-dichlor-4,4'-dimethyl-thioindigo.

*Example 2.*—By an exactly similar process 6,6'-diethoxy-thioindigo can be prepared by starting with 1-thioglycol-2-amino-5-ethoxy-benzene in place of the 1-thioglycol-2-amino-3-methyl-6-chlorbenzene as in the previous example. The dyestuff, obtained in better yield than by older methods, was 6,6'-diethoxy-thioindigo.

*Example 3.*—In a similar manner by starting with 1-thioglycol-2-amino-5-chlorbenzene the dyestuff 6,6'-dichlor-thioindigo was obtained.

This invention can be applied to the manufacture of substantially all thioindigo dyes prepared from ortho-amino-aryl-thioglycollic acids, providing the proper conditions for isolating the carboxy-3-amido-thioindoxyl be adopted. These conditions, which may be varied with each thioindigo dye considered, have to do with the caustic concentration and the temperature of the reaction employed in the conversion of the ortho-cyano-aryl-thioglycollic acids. The caustic concentration in such reaction should be such that the solution is at least alkaline to Clayton Yellow and any alkaline reacting material which is more alkaline than sodium carbonate may be employed. It is not necessary to add any alkaline reacting material other than the alkali sulfide for this purpose, provided that sufficient of the alkali sulfide is employed. Where only the alkali sulfide is employed, the amount should be sufficiently in excess to that which is equivalent to the copper, to render the solution strongly alkaline; that is, alkaline to phenolphthalein. As much more may be added as desired. However, from considerations of cost it will usually be found desirable to add only that amount of the alkali sulfide which is equivalent to the copper in the solution and employ other and cheaper alkaline reacting materials for rendering the solution alkaline in reaction.

The temperature employed in such reaction should usually be maintained between 60 and 100° C.

Also, the concentration of the salt employed in the salting out process is important. Usually, sufficient salt to saturate the solution will be found to be satisfactory but less amounts may be employed in certain cases. The temperature of the solution, in the salting out process, may be varied from about 0–60° C., although it will usually be found to be desirable to maintain the temperature above 15° C. to obviate the precipitation of undesirable salts.

By carrying out the process in accordance with our invention, the step of precipitating the ortho-cyano-aryl-thioglycollic acid by means of acid and the subsequent leaching of the nitrile from the cuprous cyanide, together with the disadvantages of such steps, are completely eliminated, thereby greatly decreasing the time and labor and consequently the cost of preparing these valuable dyes. Furthermore, the separation of the sodium salts of the carboxy-3-amido-thioindoxyl, by means of the salting out process, is more complete than the isolation of the ortho-cyano-aryl-thioglycollic acid by means of acid, as heretofore practiced. Accordingly, higher yields of dye are obtained by carrying out the process in accordance with our invention, as the loss in products entailed in the prior isolation of the ortho-cyano-aryl-thioglycollic acid are eliminated. This increase in the yield usually amounts to between 5 and 15% on a final dyestuff basis. Also, the dyes obtained in accordance with our process are higher in purity and of better shade than those heretofore produced.

While we have disclosed a process wherein specific reagents are employed in certain definite amounts, under specific conditions, it will be readily understood by those skilled in the art that many variations may be made in the reagents, amounts, and specific conditions employed without departing from the spirit of our invention. Accordingly, the scope of our invention is to be limited solely by the appended claims construed as broadly as is permissible in view of the prior art.

We claim:

1. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with an alkali metal sulfide.

2. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with sodium sulfide.

3. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with an alkali metal sulfide and an alkaline material reacting more alkaline than sodium carbonate.

4. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with a caustic alkali and an alkali metal sulfide.

5. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, treating the resulting reaction mass to render it strongly alkaline and then adding an alkali metal sulfide.

6. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, then treating the resulting reaction mass with an alkali metal sulfide, salting out the reaction products including an alkali metal salt of the carboxy-3-amido-thioindoxyl, separating the resulting solids from the solution, and then leaching out the alkali metal salt of the carboxy-3-amido-thioindoxyl with hot water.

7. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, then treating the resulting reaction mass with sodium sulfide, salting out the reaction products including the sodium salt of the carboxy-3-amido-thioindoxyl, separating the resulting solids from the solution, and then leaching out the sodium salt of the carboxy-3-amido-thioindoxyl with hot water.

8. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, then treating the resulting reaction mass with an alkali metal sulfide and an alkaline material reacting more alkaline than sodium carbonate, salting out the reaction products including an alkali metal salt of the carboxy-3-amido-thioindoxyl, separating the resulting solids from the solution, and then leaching out the alkali metal salt of the carboxy-3-amido-thioindoxyl with hot water.

9. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, then treating the resulting reaction mass with a caustic alkali and an alkali metal sulfide, salting out the reaction products including an alkali metal salt of the carboxy-3-amido-thioindoxyl, separating the resulting solids from the solution, and then leaching out the alkali metal salt of the carboxy-3-amido-thioindoxyl with hot water.

10. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, treating the resulting reaction mass to render it alkaline to phenolphthalein, then adding an alkali metal sulfide, salting out the reaction products including an alkali metal salt of the carboxy-3-amido-thioindoxyl, separating the resulting solids from the solution, and then leaching out the alkali metal salt of the carboxy-3-amido-thioindoxyl with hot water.

11. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, treating the resulting reaction mass with an alkali metal sulfide, salting out the reaction products including an alkali metal salt of the carboxy-3-amido-thioindoxyl, separating the resulting solids from the solution, and then leaching out the alkali metal salt of the carboxy-3-amido-thioindoxyl with hot water rendered slightly alkaline in reaction.

12. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, then treating the resulting reaction mass with sodium sulfide, salting out the reaction products including the sodium salt of the carboxy-3-amido-thioindoxyl, separating the resulting solids from the solution, and then leaching out the sodium salt of the carboxy-3-amido-thioindoxyl with hot water rendered slightly alkaline in reaction.

13. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, then treating the resulting reaction mass with an alkali metal sulfide and an alkaline material reacting more alkaline than sodium carbonate, salting out the reaction products including an alkali metal salt of the carboxy-3-amido-thioindoxyl, separating the resulting solids from the solution, and then leaching out the alkali metal salt of the carboxy-3-amido-thioindoxyl with hot water rendered slightly alkaline in reaction.

14. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with a caustic alkali and an alkali metal sulfide, salting out the reaction products including an alkali metal salt of the carboxy-3-amido-thioindoxyl, separating the resulting solids from the solution, and then leaching out the alkali metal salt of the carboxy-3-amido-thioindoxyl with hot water rendered slightly alkaline in reaction.

15. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, treating the resulting reaction mass to render it alkaline to phenolphthalein, then adding an alkali metal sulfide, salting out the reaction products including an alkali metal salt of the carboxy-3-amido-thioindoxyl, separating the resulting solids from the solution, and then leaching out the alkali metal salt of the carboxy-3-amido-thioindoxyl with hot water rendered slightly alkaline in reaction.

16. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with an alkali metal sulfide at about 90° C.

17. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with sodium sulfide at about 90° C.

18. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with an alkali metal sulfide and an alkaline material reacting more alkaline than sodium carbonate at about 90° C.

19. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile and then treating the resulting reaction mass with a caustic alkali and an alkali metal sulfide at about 90° C.

20. In the process of preparing thioindigo dyes, the steps which comprise diazotizing an ortho-amino-aryl-thioglycollic acid in aqueous solution, neutralizing the solution, treating the solution with sodium cuprous cyanide solution to convert the diazo compound to the nitrile, treating the resulting reaction mass to render it alkaline to phenolphthalein and then adding an alkali metal sulfide at about 90° C.

21. In the process of preparing thioindigo dyes, the steps which comprise forming an ortho-cyano-aryl-thioglycollic acid in the form of a soluble salt thereof in aqueous solution, and rendering said solution alkaline including the addition of an inorganic sulfide having an alkaline reaction.

22. In the process of preparing thioindigo dyes, the steps which comprise forming an ortho-cyano-aryl-thioglycollic acid in the form of an alkali metal salt thereof in aqueous solution, and rendering said solution alkaline including the addition of an alkali metal sulfide.

23. In a process of preparing thioindigo dyes, the steps which comprise diazotizing an ortho-amino-aryl-thioglycolic acid of the benzene series in aqueous solution, neutralizing the solution, treating the solution with sodium cuprous cyanide solution to convert the diazo compound to the nitrile, and then rendering the resultant reaction mass strongly alkaline including the addition of an alkali metal sulfide.

24. In a process of preparing 6,6'-dichlor-4,4'-dimethyl-thioindigo, the steps which comprise diazotizing 1-sodium-thioglycollate-2-amino-3-methyl-5-chlorbenzene in aqueous solution, neutralizing the solution, treating the solution with sodium cuprous cyanide solution to convert the diazo compound to the nitrile, and then rendering the resultant reaction mass strongly alkaline with sodium hydroxide and sodium sulfide.

HERBERT AUGUST LUBS.
JOHN ELTON COLE.